United States Patent [19]

Kadota

[11] 4,062,419
[45] Dec. 13, 1977

[54] FUEL-SAVING TRAVELING SYSTEM FOR AN INTERNAL COMBUSTION ENGINE-DRIVEN VEHICLE

[75] Inventor: Masahiro Kadota, Susono, Japan

[73] Assignee: Toyota Jidosha Kogyo Kabushiki Kaisha, Toyota, Japan

[21] Appl. No.: 653,027

[22] Filed: Jan. 28, 1976

[30] Foreign Application Priority Data

Feb. 7, 1975 Japan .................................. 50-15274
Dec. 11, 1975 Japan .................................. 50-147627

[51] Int. Cl.$^2$ ............................................. B60K 17/26
[52] U.S. Cl. ................................. 180/70 R; 192/41 R; 200/61.89; 290/38 E
[58] Field of Search ........................... 180/70 R, 77 R; 192/41 R, 50; 74/869, 866; 200/61.89, 61.9; 290/37 R, 38 E, 38 R

[56] References Cited

U.S. PATENT DOCUMENTS

| | | | |
|---|---|---|---|
| Re. 16,067 | 5/1925 | Feltz ................... | 180/70 R |
| 1,900,119 | 3/1933 | Lysholm ............... | 180/70 R |
| 2,082,129 | 6/1937 | Van Ranst ............. | 180/70 R |
| 2,090,123 | 8/1937 | Hoffman ............... | 180/70 R X |
| 2,775,711 | 12/1956 | Kommer ............... | 200/61.89 X |

Primary Examiner—Joseph F. Peters, Jr.
Assistant Examiner—Terrance L. Siemens
Attorney, Agent, or Firm—Stevens, Davis, Miller & Mosher

[57] ABSTRACT

A fuel-saving traveling system for an internal combustion engine-driven vehicle has a one-way clutch in the drive train allowing the wheels to overrun the engine. A fuel-saving traveling system for an internal combustion engine-driven vehicle, wherein a vehicle provided with an internal combustion engine travels on a flat and smooth road in such a manner that the said internal combustion engine is started from lower speed than the average speed specified in advance for the said vehicle, to be thus driven at high load, and, after the speed of the vehicle reaches a higher level of speed than the said average speed, the said internal combustion engine is stopped and the said vehicle is caused to travel in a drifting state by means of the one-way clutch incorporated in the driving system of the said internal combustion engine-driven vehicle, then, when the speed of the vehicle is slowed down to a lower level than the said average speed, the engine is started again, whereby the said cycle is repeated over and over again.

14 Claims, 11 Drawing Figures

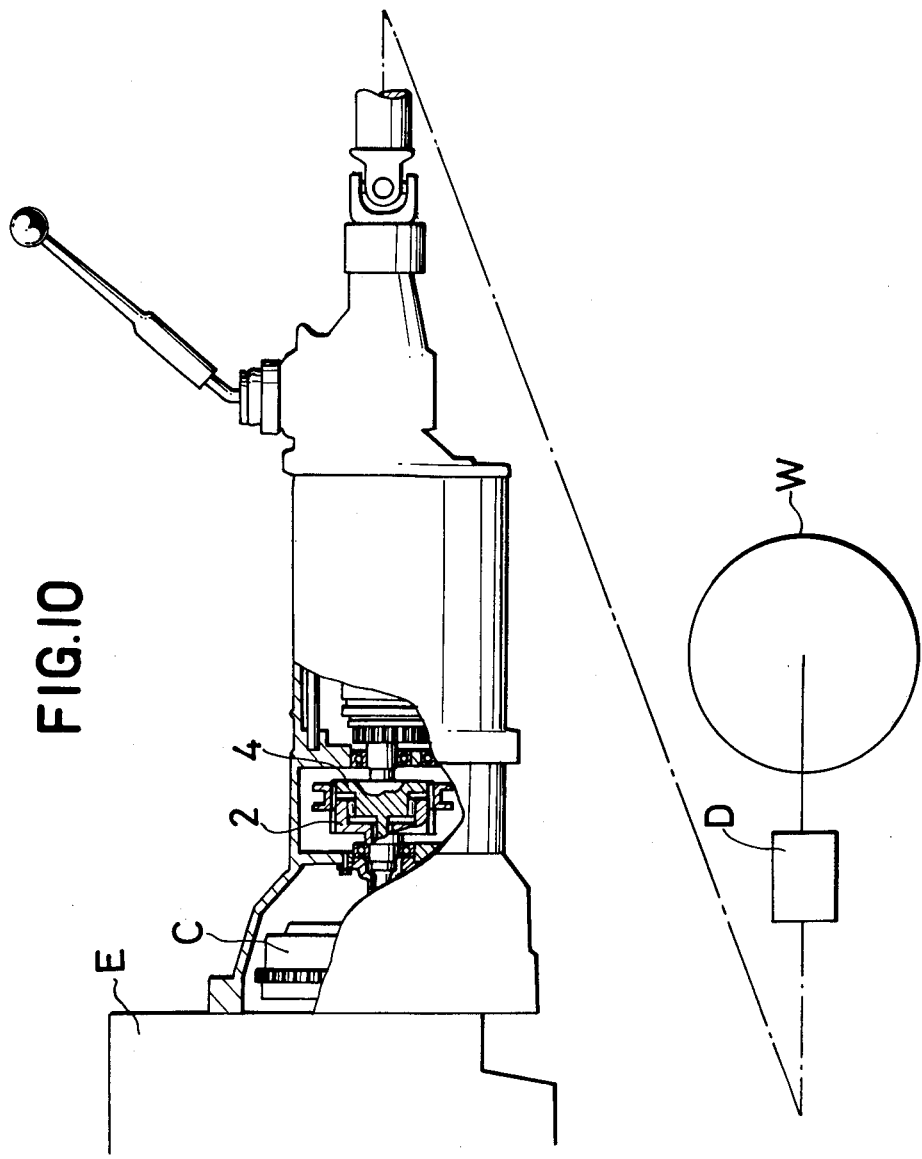

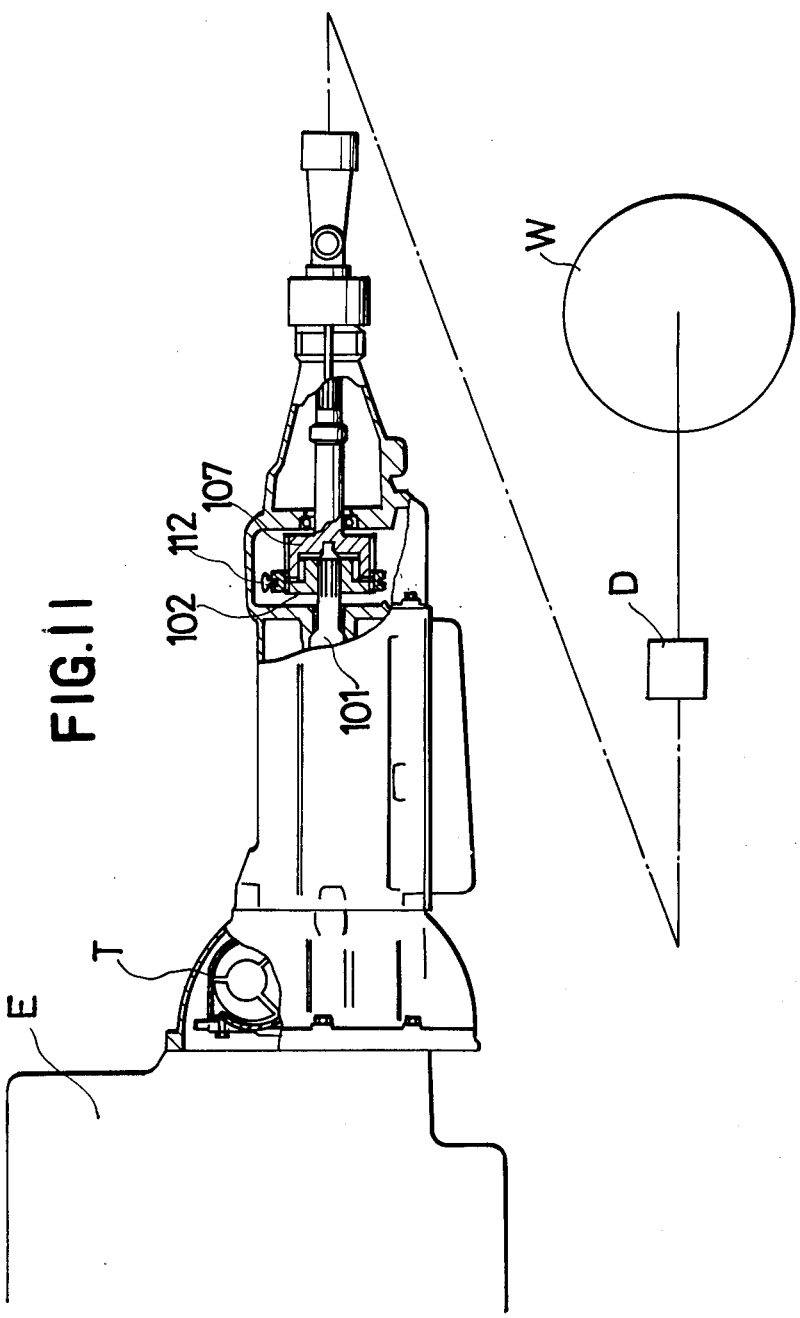

FUEL-SAVING TRAVELING SYSTEM FOR AN INTERNAL COMBUSTION ENGINE-DRIVEN VEHICLE

BACKGROUND OF THE INVENTION

The present invention relates to a method of, and an apparatus for, fuel-saving travel of an internal combustion engine-driven vehicle.

In the range of the revolution often selected for use in a usual case for a conventional internal combustion engine to be mounted on an automobile, efficiency is high enough and fuel consumption (g/Ps.h) is favorable enough in the case of high load in general; however, in the case of low load, to the contrary, efficiency is low and fuel consumption (g/Ps.h) is unfavorable. Now that an automobile conventionally has the transmission gear ratio thereof so set as to be capable of a wide range of use, including acceleration and traveling up a slope, a range of low load is usually selected at the time of traveling at constant speed on a flat and smooth road at either intermediate or low speed, which results in that an engine is low in efficiency and selection of a range of unfavorable fuel consumption becomes imperative. Furthermore, the engine is kept in an operating state even at the time of traveling up a slope, drifting, and stoppage, to put it otherwise, the engine itself remains running even in case the engine is not required to be thus kept in an operating state, hence a fairly great deal of fuel is consumed. For instance, even at the time of stoppage, drifting, or traveling down on such a comparatively gentle slope as enables an automobile to travel without employing an engine brake, the automobile has the engine put in an operating state with an accelerator kept totally or nearly closed, and in the case of a gasoline engine, 10–50 cc/minute (0.6 l/hour-3 l/hour) of fuel is thus consumed unnecessarily, although the correct quantity of the fuel thus wasted depends on the displacement of the automobile. Even in the case of traveling at constant speed on a flat and smooth road, the load to be applied on an engine mounted on automobiles other than those of small displacement, including a light car, is rather small in the range of the ordinary car speed of 100km or less for use, and the said load is especially small in the case of traveling at low speed, which has thus far resulted in that a range of quite low efficiency has to be selected in terms of the characteristics of an internal combustion engine, thus involving such a defect that the fuel cost becomes high and hence unfavorable.

SUMMARY OF THE INVENTION

The object of the present invention is to provide such a method and such an apparatus as are well capable of improving the efficiency of an internal combustion engine and of saving fuel.

According to the present invention, a one-way clutch is arranged in place in a part of the power transmission mechanism of an internal combustion engine-driven vehicle (for one thing, automatically starting and stopping an engine by means of applying pressure on an accelerator and by means of relieving the pressure off the accelerator).

In one of the preferred embodiments of the present invention, a one-way clutch (a freewheel) is arranged in a driving system, for instance, either in front, or in the rear, of a transmission gear, to thus form such a construction as enables driving only from the side of an engine. In case the driven side freely revolves faster, the system stops the engine when the pressure is relieved from the accelerator pedal, and starts the engine when the accelerator pedal has pressure applied thereon. At the time of traveling down a slope, drifting, or when stopped, the engine is thus caused to be stopped by relieving the accelerator pedal pressure, to thus cause an automobile to continue traveling by virtue of the potential energy and the kinetic energy, thereby saving the fuel to be consumed in the course of that time when traveling on a flat and smooth road, such a range wherein the engine is kept high enough in terms of efficiency (that is to say, favorable in terms of fuel consumption) is specifically selected for proper acceleration up to a higher level of speed than target speed, the pressure is released from the accelerator pedal to stop the engine and the vehicle drifts until a lower level of speed than the target level of speed or even a lower level is reached. At that time the said action of treading on the accelerator pedal for startup and acceleration is repeated over and over again, to thus continue travel until the average speed reaches the level of the target speed, whereby a few score percent of fuel is saved in a favorable manner, compared with traveling at constant speed.

In another preferred embodiment of the present invention, in an attempt of preventing such a case from being given birth wherein a one-way clutch shoved in, prior to throwing a transmission gear in, in the case of such an automobile as has a torque converter specifically employed therefor, might possibly result in seizing of the transmission gear due to shortage of a lubricant to be supplied, which is attributable to no operation of an oil pump for the engine in an inoperative state, such a type of construction that a one-way clutch is arranged in place between the output shaft of the transmission gear and the sleeve yoke of a propeller shaft, and driving force can be applied only from the side of the engine, is specifically contrived, and, it constitutes such a system that, in case the driven side is higher in terms of the number of revolutions, only the driven side is so designed as to be put in revolution in a free manner, such a system wherein the engine is stopped when the pressure is released from the accelerator. The engine is started when the accelerator pedal has pressure applied thereon by treading thereon. The engine is stopped whenever the pressure is relieved from the accelerator pedal at the time of traveling down a slope, drifting, and when stopped, thus enabling the automobile to continue travel in a proper manner by virtue of the potential energy and the kinetic energy. Thanks to the contrivance of such a system as is elucidated in the preceding paragraphs, a corresponding quantity of fuel to be otherwise consumed at the time of traveling down a slope, drifting, and when stopped, can thus be saved in a proper and favorable manner. To add up thereto, in the case of traveling on a flat and smooth road, speed of an automobile is subjected to acceleration by making selection of such a range wherein the engine remains high enough in terms of efficiency (to put it otherwise, wherein the engine proves favorable enough in terms of fuel consumption), until a higher level of speed than the target speed is reached, the accelerator pedal is relieved off the pressure applied thereon to thus keep drifting until a lower level of speed than the target speed is reached, the accelerator pedal has pressure applied thereon to thus keep drifting until a lower level of speed than the target speed is reached, the accelerator pedal has pressure applied thereon once again by treading thereon, and the action to start the engine and accelerator is repeated, until the automobile is put in the traveling state in such a manner that the average speed reaches the level of the target speed, whereby a few score percent of fuel can be saved in a favorable manner, compared with the case of traveling at constant speed, (in general terms, this is often the case when such a range wherein the engine is low in terms of efficiency, hence unfavorable in terms of fuel consumption).

The one-way clutch has a conventional clutch properly arranged therefor in such a manner that the one-way clutch can be directly connected with the latter. In the case of traveling down a slope of sharp inclination wherein an accelerator is kept totally closed and an engine brake is required to be applied, the said couple of clutches are to be put in such a state that the said conventional clutch is to be selected for operation and the one-way clutch is so enabled as to have the action thereof rendered null, hence inoperative.

BRIEF DESCRIPTION OF THE DRAWINGS

FIG. 10 is a view, partly in section, showing the first embodiment of the invention on a vehicle; and FIG. 11 is a view, partly in section, showing the second embodiment of the invention on a vehicle.

DESCRIPTION OF THE PREFERRED EMBODIMENTS

Figure 1:
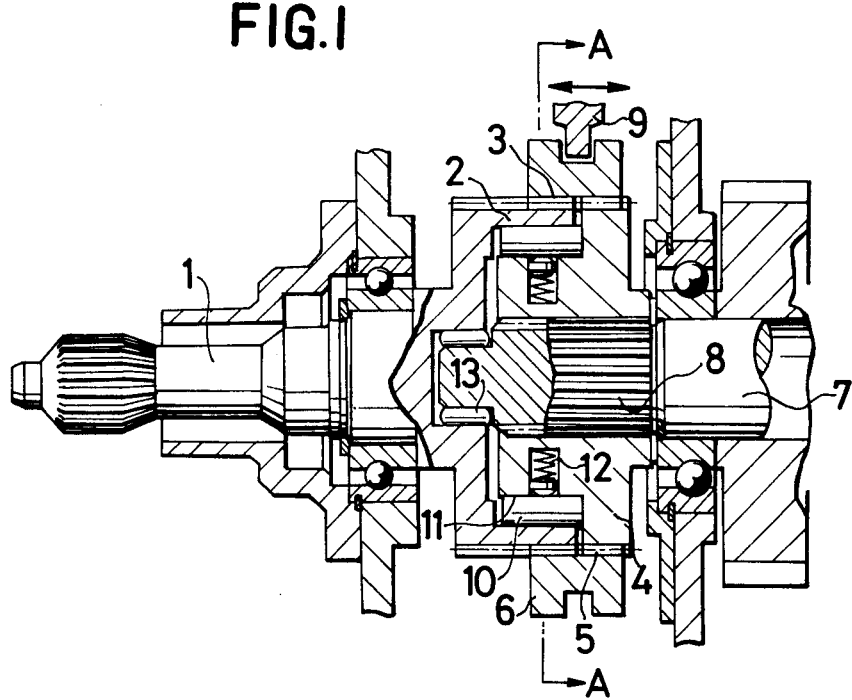
FIG. 1 is a section of the one-way clutch arranged in place in one embodiment of the present invention.
Figure 2:
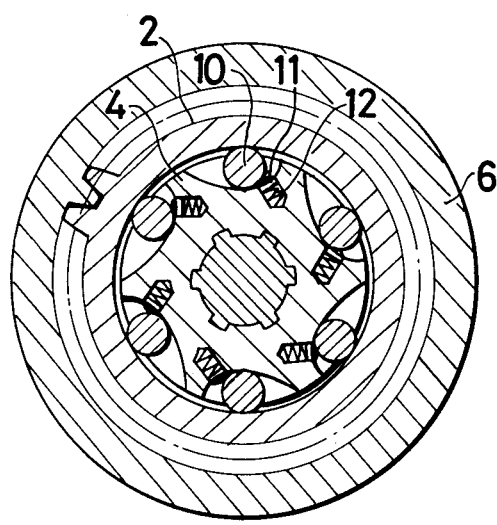
FIG. 2 is a section viewed along the A—A line shown in FIG. 1.

Shown in FIG. 1 is an illustration of the fuel-saving traveling system introduced in the present invention, and shown in FIG. 2 is a section viewed along the A—A line shown in FIG. 1. In the case of this illustration, a one-way cluth is arranged in place between a conventional clutch and a transmission gear. The one-way clutch is capable of being arranged in place at some other position. However, in case the one-way clutch is arranged in place at a position following that of the transmission gear, the driving torque by a low-speed gear grows larger, which results in that the capacity of the one-way clutch has to be increased. Therefore, in this illustration, the one-way clutch is arranged in place in front of the transmission gear. Shown in the drawing is only a portion adjacent to the one-way clutch; however, one example of this category of mechanism is disclosed in, for one thing, the British Pat. No. 1,078,720 entitled "Improvements relating to power units with Built-in transmission assemblies".

In FIG. 1, a part of an input shaft 1 forms an outer race 2 of the one-way clutch; however, the outer race 2 may be formed otherwise not into an integral entity with the input shaft 1 but in a separate manner, then fitted in place into the input shaft 1. The outer race 2 can have a plurality of splines 3 formed by crimping on the outside of the outer race 2, to thus be properly separated from, and coupled with splines 5 formed on the outer periphery of a one-way clutch rotor 4 by means of a clutch hub 6. The clutch hub 6 is transferred by a fork 9, and is thus subjected to separation from, and coupling with, the splines 5 in such a manner as is set forth above. An input gear shaft 7 is properly fixed in place on the one-way clutch rotor 4. The outer race 2 has a clutch roller 10 kept in pressure contact therewith by means of a spring 12 through a shim 11. A bearing 13 is properly arranged in place between the input shaft 1 and the input gear shaft 7 in a manner of being interposed in place between both.

Figure 3:
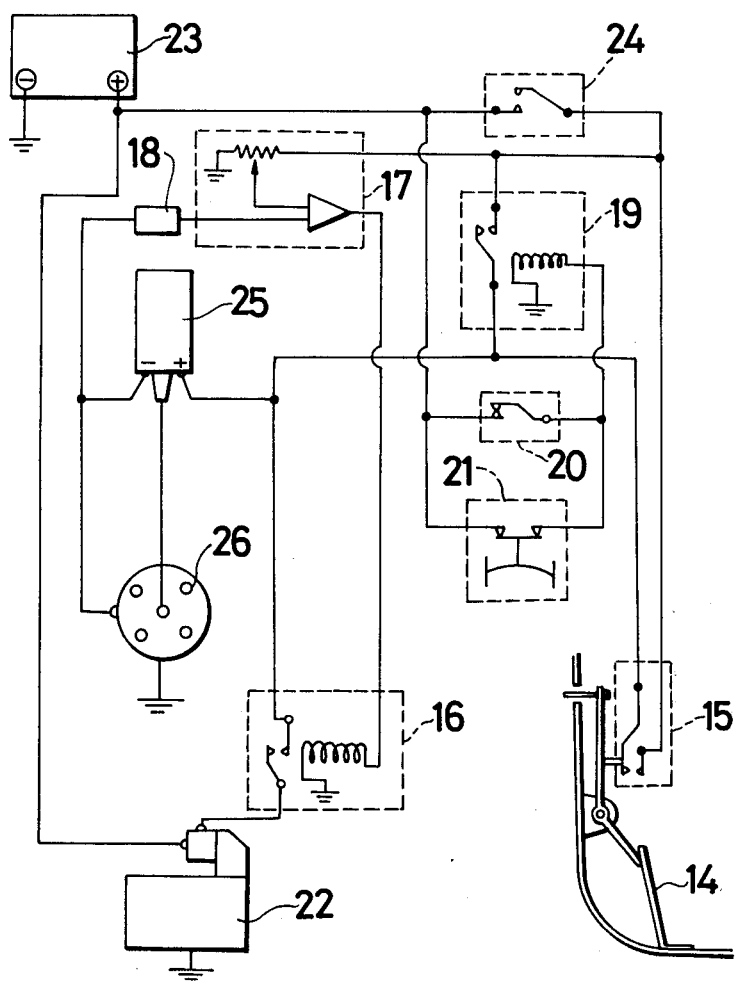
FIG. 3 is an electrical circuit diagram for the control system introduced in the present invention.

FIG. 3 is an explanatory diagram specifically prepared for the purpose of showing the control system for startup and stoppage of the engine. Connected with such an ignition starter switch 15 as detects the action of an accelerator 14 is a starter relay 16 that stops a starter 22 in the wake of the startup of the engine, and connected with the starter relay 16 is a comparator 17 for the purpose of detecting the startup of the engine and actuating the starter relay 16. The pulse of an ignition coil is converted into voltage by a converter 18. When the ignition starter switch 15 is kept turned off, an ignition circuit is short-circuited by an ignition relay 19. A water temperature sensor 20 senses the temperature of water, and actuates the ignition relay 19 at the time of warming-up of the engine. A pressure sensor 21 senses the pressure of a brake booster, and actuates the ignition relay 19. 22 represents a starter, 23 represents a battery 25 an ignition coil, and 26 represents a distributor, respectively.

FIG. 10 shows the first embodiment of the invention in position on a vehicle having an engine E, clutch C, differential gear D and wheel W.

A description of the operation of the fuel-saving traveling system employed in this illustration is as set forth in the following paragraphs. When an operator puts the fuel-saving traveling system in operation first by closing the ignition key switch 24, and treads on the accelerator pedal 14, the ignitiion starter switch 15 is closed, the starter 22 is actuated, and the engine is started. When the engine is thus started, the pulse on the primary side of the ignition coil 25 is converted into voltage by the converter 18, the voltage is subjected to comparison with voltage of such a number of revolutions as is so preset by the comparator 17 as to be slightly less than the number of revolutions, startup of the engine is properly sensed, the output current of the comparator is reduced to the level of zero, and the relay 16 is cut off, then the starter 22 is stopped. When the pressure is released from the accelerator pedal 14, the switch 15 is opened, and the engine stops. However, while warming-up of the engine is under way, and in case the pressure of the brake booster is sensed by the water temperature sensor 20 to the effect that the pressure proves to have fallen short, the relay 19 is actuated by virtue of the pressure sensor 21, until an ignition circuit is short-circuited; therefore, the engine is kept from being stopped, even in case the pressure is relieved from the accelerator pedal 14. Now, even in case the engine is being thus stopped, either the water temperature sensor 20 or the pressure sensor 21 is actuated, whereby the engine is started in a proper manner.

With regard to the output of the engine, in case the clutch hub 6 does not keep the input shaft 1 and the rotor 4 coupled with each other, and the number of revolutions of the input shaft 1 is in excess of that of the input gear shaft 7, the roller 10 is interposed in place between the one-way clutch rotor 4 and the outer race 2, and the torque is transmitted in sequence from the input shaft 1 → the outer race 2 of the one-way clutch → the roller 10 → the one-way clutch rotor 4 → the input gear shaft 7. In case the number of revolutions of the input gear shaft 7 is in excess of that of the input shaft 1, the roller 10 is subjected to racing in the space formed between the rotor 4 and the outer race 2; therefore, the torque is not transmitted. Furthermore, in case the clutch hub 6 keeps the input shaft 1 and the rotor 4 coupled with each other, the torque is transmitted in sequence from the input shaft 1 → the spline 3 → the clutch hub 6 → the one-way rotor 4 → the input gear shaft 7, and the one-way clutch is not actuated.

Now that the one-way clutch introduced in the present invention has such a construction and such a function as are set forth in the preceding paragraphs, in case an automobile is in the state of traveling down a slope to such a degree as specifically requires no engine brake or in the state of drifting just in front of a signal, the engine is stopped when an operator relieves off the pressure applied on the accelerator pedal, and the one-way clutch is actuated in a proper manner, whereby the automobile continues to travel by virtue of such potential energy and such kinetic energy as have been thus far held by the automobile. In case the speed of the automobile is reduced and slowed down to an excessive degree, the matter specifically required to cope with such a situation is to tread on the accelerator, thus putting the engine in revolution in a proper manner and thereby effectuating proper supply of kinetic energy. By so doing, fuel can be saved in a proper manner as long as the engine is kept out of operation. In case the one-way clutch is not available, although the engine is in use in such a state wherein the fuel consumption is at the minimum possible level, such a use of the engine still results in the consumption of an additional quantity of fuel by as much as, for instance, 10-15 cc/min (0.6-3 $l$/h).

In addition thereto, in case an operator relieves off the pressure applied to the accelerator by not treading thereon, at the time of the stoppage of an automobile, the engine is stopped in an automatic manner, whereby the fuel consumption is saved in a manner of corresponding to the stoppage and the idling.

Figure 4:
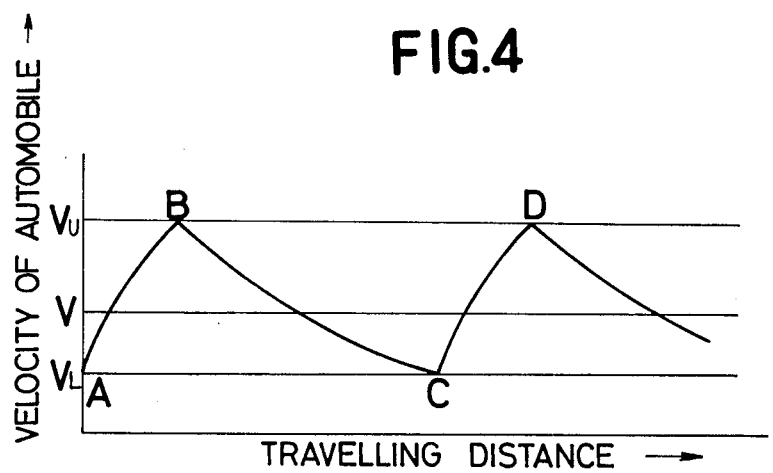
FIG. 4 is an explanatory diagram of the traveling method, in the repeated cycle of acceleration and drifting of an internal combustion engine-driven vehicle employing the fuel-saving traveling system introduced in the present invention.

Next, given below will be a description with regard to the case of traveling on a general flat and smooth road, FIG. 4 is an explanatory diagram specifically prepared for the purpose of disclosing the traveling method in the cycle of acceleration and drifting of an automobile in the case of having the fuel-saving traveling system introduced in the present invention specifically employed therefor. Now, suppose the proposed traveling speed of an automobile, to put it otherwise, the target traveling speed of an automobile, to be V, saving of the fuel to be consumed at the time of traveling on a flat and smooth road, through the employment of the fuel-saving traveling system introduced in the present invention, can be attained in a proper manner by the application of the traveling method of repeating a cycle comprising a series of such processes that the velocity is subjected to acceleration from such a level of velocity $V_L$ as is lower than the level of velocity V and shown at the point A in FIG. 4 up to such a level of velocity $V_U$ as is higher than the level of velocity V and shown at the point B in FIG. 4, by making selection of the range Q shown in FIG. 5 and enabling the engine to display a quite high level of efficiency, that the pressure on the accelerator pedal 14 is relieved, to thus cause the engine to be stopped, that drifting is continued until the initial velocity $V_L$ is reached, to thus run as far as to the point C, by the employment of the one-way clutch mechanism shown in FIG. 1 and FIG. 2, and that, in the wake thereof, pressure is to be applied on the accelerator 14 once again by treading thereon.

Figure 5:
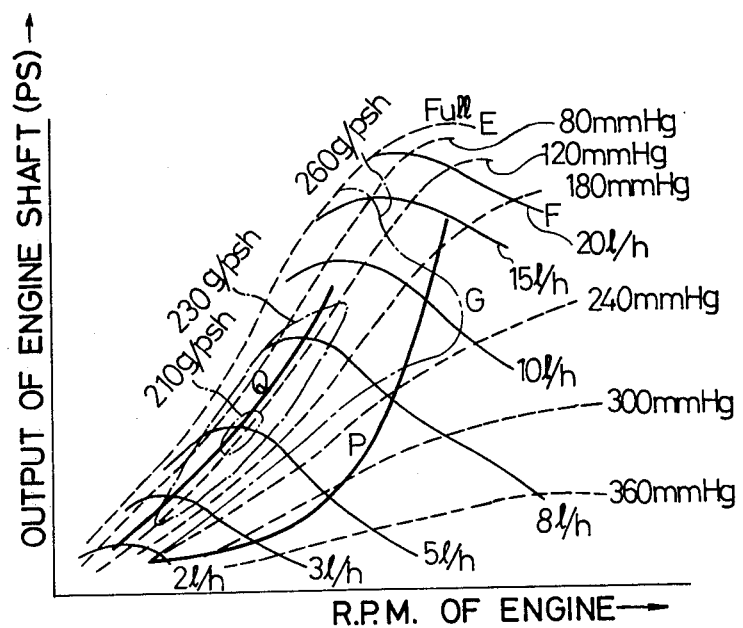
FIG. 5 is an explanatory diagram of the fuel cost characteristics of a gasoline engine for a general automobile.

FIG. 5 is a diagram specifically prepared for the purpose of disclosing the fuel cost characteristics of a general type of gasoline engine. In the diagram, such a range as is in the proximity of the opening to the full, that is to say, such a range wherein the negative pressure of a manifold is around 0-150mmHg, dependent upon the specifications for the engine though it is, proves high enough in terms of efficiency and low enough in terms of the ratio of the fuel cost (g/Ps.h), and the general trend is such that the higher the negative pressure of the manifold is, the lower the efficiency is. For instance, in the case of traveling at constant speed on a flat and smooth road at the conventional velocity of around 100km or less, the range selected for the use of the engine mounted on virtually any type of automobile is such that is in the proximity of the range of P shown in FIG. 5, wherein the engine proves to be comparatively poor in terms of efficiency. The traveling method shown in FIG. 4 is what is specifically contrived in an attempt of making selection of only such a range wherein the engine proves to be effective enough, thereby improving the ratio of the fuel cost, and, when the balance of the fuel cost between the case of the traveling method shown in FIG. 4 and the case of the traveling at the constant speed of the velocity V is taken into account in the interest of instituting a comparison, by making selection of an automobile of approximately one ton in weight as an example, it becomes evident that the ratio of the fuel cost can be improved by as much as approximately 40–50% at around 50km/h in average speed, dependent upon the characteristics of the engine selected therefor.

One example of the assumed improvement of the ratio of the fuel cost will be introduced below through a series of calculation formulas. Suppose that the gross weight of a vehicle is 1,255kg, the equivalent weight of rotating parts $\Delta W$ is 77.5kg (with the one-way clutch set at the position of ON), $\Delta W'$ is 39kg (with the one-way clutch set at the position of OFF), the front surface projection area A is 1.78m², the air resistance coefficient Cd is 0.431, the rolling resistance coefficient $\mu_r$ is 0.022, the effective radius of a tire is 0.285m, the differential gear ratio $\epsilon_d$ is 4.1, and the transmission efficiency of a driving system $\eta_d$ is 0.95, now the relation between the resistance to travel R and the torque of the engine $T_E$ is as shown in the following formula: At the time of acceleration $$T_E \cdot \eta_d \cdot \frac{\epsilon_d}{R} = \mu_r w + \frac{1}{2} Cd\rho A v^2 + (W + \Delta w)\frac{a}{g} \qquad (1)$$

Here, $\rho$: Density of air, v:Velocity of automobile in Km/h, $\alpha$: Acceleration At the time of traveling at constant speed $$T_E \cdot \eta_d \cdot \frac{\epsilon_d}{R} = \mu_r w + \frac{1}{2} Cd\rho A v^2 \qquad (2)$$

Acceleration $$\alpha = \frac{g}{w + \Delta w} \left\{ \frac{TE \cdot \eta d \cdot \epsilon d}{R} - \mu rw - \frac{1}{2} Cd\rho A v^2 \right\} \qquad (3)$$

Deceleration at the time of drifting $$\alpha = \frac{g}{w + \Delta w'} \left\{ \mu rw + \frac{1}{2} Cd\rho A v^2 \right\} \qquad (4)$$

Figure 6:
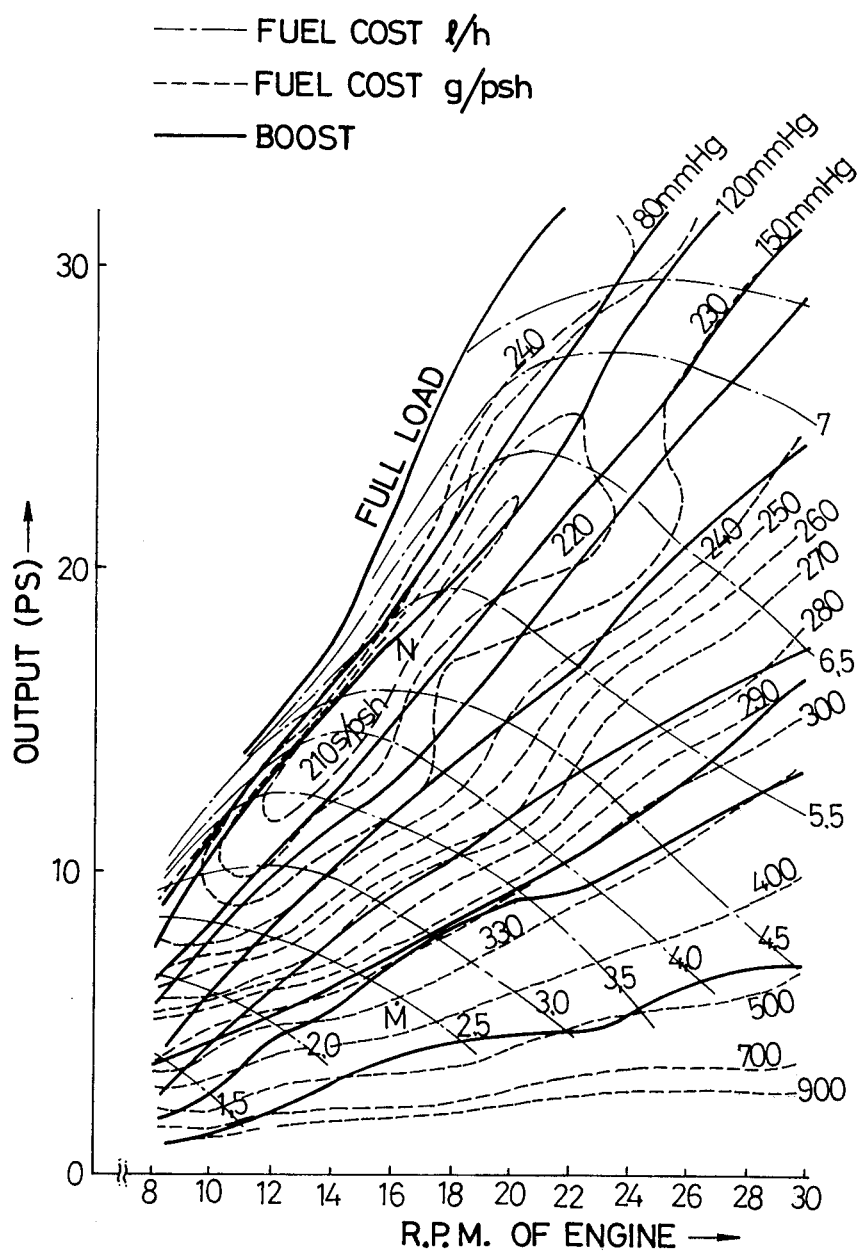
FIG. 6 is a curve diagram of the fuel cost characteristics of a certain specific gasoline engine.

In the case of V=42, $V_L$=40, and $V_U$=45, the performance of the engine and the resistance to the travel are respectively taken to be constant in the range of 40–45km/h, and values thereof at the level of 42.5km/h is so selected as to be the typical values, and, when approximate calculation is conducted as to one cycle shown in FIG. 4, the ratio of the fuel consumption by the engine kept in the state of the accelerated travel thereof at the said level of 42.5km/h is 5.2 $l$/h (at the point of N shown in FIG. 6), when converted at the ratio of approximately 210g/Ps.h. The ratio of the fuel consumption by the engine kept in the state of traveling at the constant speed of 4.25km/h is 2.5 $l$/h (at the point of M shown in FIG. 6), when converted at the ratio of 330g/Ps.h. In case the acceleration and the deceleration are assumed to be constant, respectively, the traveling distance s and the time t required therefor can be calculated by the application of such formulas as $s = (V^2_U - V^2_L)/2\alpha$ and $t = (V_U - V_L)/\alpha$, respectively, when the acceleration and the deceleration are both taken to be $\alpha$. In this case, $\alpha$= 0.53m/s, S=30.5m, t=2.62s at the time of acceleration, and $\alpha$=0.26m/s, S=62.1m, t=5.34s at the time of deceleration, respectively.

The fuel cost required for one cycle is thus to be (30.5+62.1) × 3,600/5.2 × (2.62=5.34) × 1,000 = 24.4km/l and the average speed is thus to be (30.5+62.1) × 3,600/(2.62+5.34) × 1,000 = 41.9km/h ≈ 42km/h Therefore, the fuel cost required for the travel at the constant speed of 42 km/h is so calculated as to be 42/2.5 = 17.2km/l.

Accordingly, the factor of the improvement in fuel consumption materialized by the application of the cycle of the acceleration and the drifting shown in FIG. 4 is (24.4–17.2) × 100/17.2 = 42%. When calculation is conducted as to the case of 47 of (V=47, $V_L$=45, $V_U$=50), V=52, $V_L$=50, $V_U$=55), (V=57, $V_L$=55, $V_U$=60), and (V=49, $V_L$=40, $V_U$=60), by the application of the same method, the factors of the improvement in fuel consumption are 47, 44, 32, and 40%, respectively. To add up thereto, in case an automobile employing the fuel-saving traveling system introduced in the present invention actually travels in a practical instance, such an improvement in fuel consumption through the travel on a flat and smooth road as is proved by the above-mentioned calculation is coupled with such saving of fuel at the time of traveling down a slope, drifting, and stoppage as is set forth above, thus serving a great deal in terms of saving of the fuel. However, in case the method operation is applied for many hours, the additional quantity of fuel corresponding to the electrical power to be consumed by the starter is naturally required to be taken into account.

Figure 7:
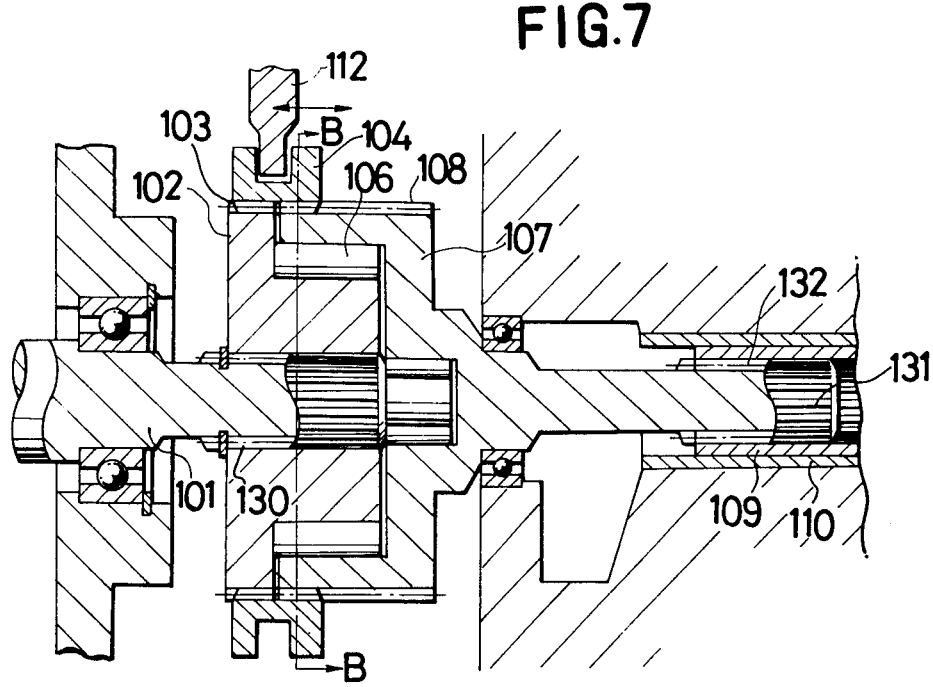
FIG. 7 is a section of the one-way clutch arranged in place in a second embodiment of the present invention.

Next, given below will be a description of a second embodiment of the present invention by making reference to FIGS. 7, 8 and 9. FIG. 7 is an explanatory diagram showing the vicinity of the one-way clutch arranged in place in the case of another illustration of the present invention. In this example, the one-way clutch is arranged in place between the output shaft and the propeller shaft of the transmission gear of the one-way clutch. In the case of a low-speed gear, the driving torque thereof is increased; therefore, it is recommended that the low-speed gear be arranged in place before a transmission gear; however, in the case of an automatic transmission gear, a lubricant pump for the transmission gear is driven by engine in many an instances, which results in that the low-speed gear is thus arranged after the transmission gear, so that the transmission gear can likewise be kept free from being put in revolution, when the engine is stopped.

The output shaft 101 is coupled with an inner one-way clutch 102 by means of a plurality of splines 130, and the inner one-way clutch 102 has such splines 103 as are specifically designed so as to be engaged with a clutch hub 104 properly formed by cutting on the outer periphery thereof. Likewise, the outer one-way clutch 107 has such splines 108 as are specifically so designed as to be engaged with the clutch hub 104 properly formed by cutting on the outer periphery thereof. Rollers 106 are properly arranged in place between the inner one-way clutch 102 and the outer one-way clutch 107. One end 131 of the outer one-way clutch 107 has splines 132 properly formed thereon. A bearing 110, engaged with a propeller shaft sleeve yoke 109, holds the sleeve yoke 109 properly in place. A fork 112 transfers the clutch hub 104 rightward and leftward as shown in the drawing.

Figure 8:
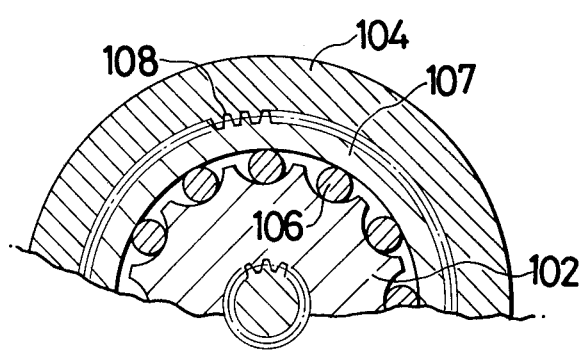
FIG. 8 is a section viewed along the B—B line shown in FIG. 7.

FIG. 8 is a section viewed along the B—B line of the one-way clutch shown in FIG. 7.

Figure 9:
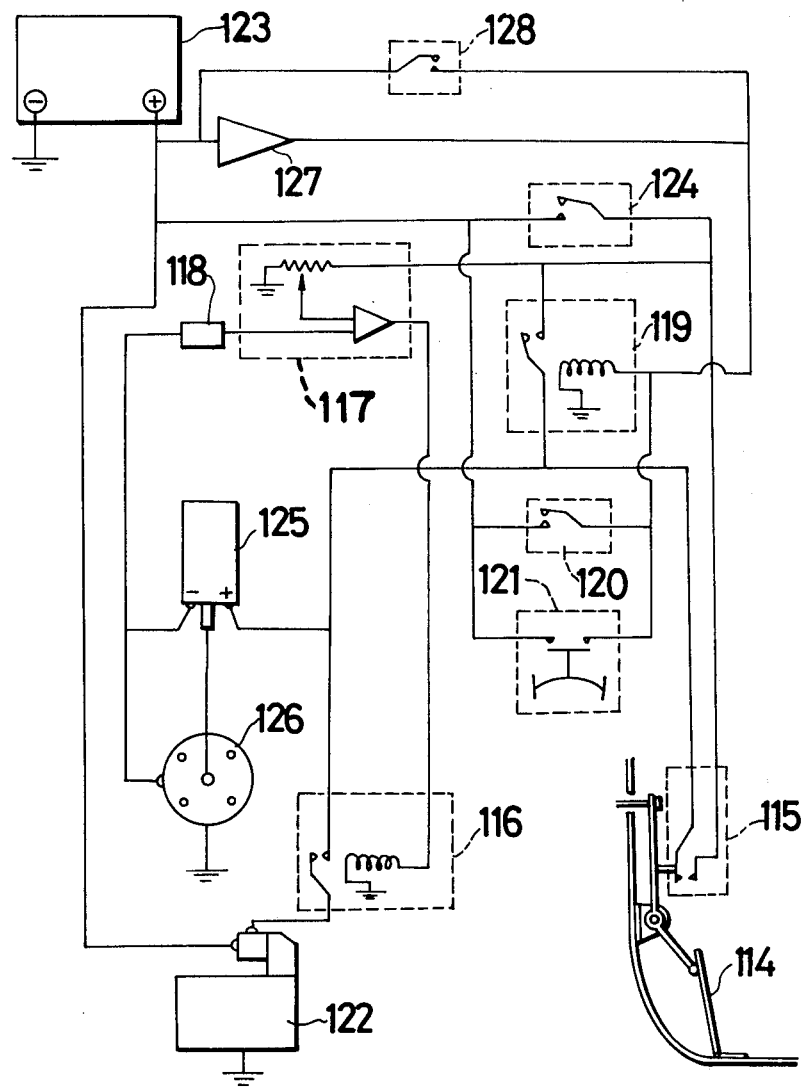
FIG. 9 is an electrical circuit diagram for other control system.

FIG. 9 is an explanatory diagram specifically prepared for the purpose of showing the control system for the startup and the stoppage of the engine. An ignition starter switch 115 for sensing the action of an accelerator pedal 114 has such a starter relay 116 as puts the starter in stoppage after the startup of the engine properly connected therwith, and connected therewith in such a comparator 117 as is specifically designed for sensing the startup of the engine and actuating the said starter relay 116. The pulse of an ignition coil 125 is converted into voltage by a transducer 118. When the ignition starter switch 115 is kept set at the position of OFF, the ignition circuit therefor is short-circuited in a proper manner by means of an ignition relay 119. A water temperature sensor 120 senses the temperature of water, and actuates the ignition relay 119 at the time of warming-up the engine. A pressure switch 121 senses the pressure of a brake booster, and actuates the said ignition relay 119. 122 is a starter, 123 is a battery, 124 is an ignition key switch, 125 is an ignition coil, 126 is a distributor, 127 is a voltage sensor, and 128 is a switch, respectively.

Now, given below will be a description of the function of this illustration.

First, when an operator sets the ignition key switch 124 at the position of ON, and applies pressure on the accelerator 114 by treading thereon, the ignition starter switch 115 is closed, the starter 122 is actuated, and the engine is started. As soon as the engine (not shown in the drawing) is thus started, the pulse of the ignition coil 125 is converted into voltage by means of an F-V transducer, the voltage is subjected to comparison with voltage (of such a number of revolutions as are preset by the comparator 117 in a manner of being slightly fewer than the number of revolutions for idling), startup of the engine (not shown in the drawing) is properly sensed, the output current of the comparator is reduced down to the level of zero, the relay 116 is switched off, and the starter 122 is thus stopped. When the pressure applied on the accelerator pedal 114 is relieved, the switch 115 is opened, and the engine is thus stopped. However, the relay is so designed as to be actuated in a proper manner by the water temperature sensor 120, when warming-up of the engine is under way, by the pressure sensor 121 when the pressure of the brake booster falls short, by the voltage sensor when the voltage of the battery drops below a specified level, and by the switch 128 specifically designed for sensing the action of the fork 112 when the one-way clutch is coupled in a direct manner, respectively, whereby the ignition circuit is short-circuited in a proper manner. Therefore, the engine is kept free from being stopped, even in case the pressure applied on the accelerator 114 is relieved. In case the engine should be stopped, while the ignition switch 128 is kept closed in a proper manner, the engine is started automatically as long as either one of the water temperature sensor 120, the pressure sensor 121, the voltage sensor 127 and the switch 128 is kept switched on.

With regard to the output of the engine, in case the inner one-way clutch 102 and the outer one-way clutch 107 are not coupled with each other in a proper manner by the clutch hub 104, and when the number of revolutions of the output shaft 1o1 of the transmission gear is in excess of that of the outer one-way clutch 107, the roller 106 is interposed in place between the inner one-way clutch 102 and the outer one-way clutch 107, and the torque is transmitted in the sequence 101 → 102 → 106 → 107, while, in the reverse case, the roller 106 is simply subjected to racing between the inner one-way clutch 1o2 and the outer one-way clutch 107, whereby the inner one-way clutch 102 is kept free from being subjected to rotation. In case the inner one-way clutch 102 and the outer one-way clutch 107 are coupled with each other by means of the clutch hub 104, the one-way clutches are kept completely free from performing the function thereof.

FIG. 11 shows the second embodiment of the invention in position on a vehicle having an engine E, torque converter T, differential gear D and wheel W.

Now that the aforementioned one-way clutches have such construction and functions as are elucidated in the preceding paragraphs, relief of the pressure on the accelerator stops the engine, at the time of the travel of an automobile down a slope and the drifting thereof as well, in more specific terms, in the case of traveling down such a slope as does not specifically require the application of an engine brake, and in the case of drifting before a traffic signal or the like. In such cases, the said one-way clutches are actuated, which results in that the automobile is thus enabled to continue the travel thereof by virtue of such potential energy and such kinetic energy of the automobile as have been thus far kept in storage therein for its own use. In case the speed of the automobile is slowed down excessively beyond a reasonable level, a method of coping with such a situation is simply that a tread be given on the accelerator, to thus put the engine in revolution for supplying kinetic energy. In such a case, fuel can be saved by as much as is corresponding to the time the engine is stopped. In case the fuel-saving traveling system introduced in the present invention is not employed, 10–50cc/min (0.6–3l/h) of additional fuel is to be consumed, dependent upon the level of displacement the quantity is, even in case the engine is kept in use in the state of virtual idling wherein the fuel consumption is reduced to the minimum level.

Furthermore, when an automobile is stopped, relief of the pressure applied on the accelerator causes the engine to be stopped automatically, which results in saving of the fuel to be otherwise consumed for stoppage and idling.

As set forth in the preceding paragraphs, the fuel-saving traveling system introduced in the present invention enables an automobile to continue its travel, with an engine stopped, completely free from the trouble of disengaging the clutches, relief of the pressure on the accelerator by a driver causes the engine to be stopped, and a tread on the accelerator starts the engine, through the switch specifically arranged therefor, whereby saving of fuel can be effected by automatically stopping the engine at the time of traveling downhill, drifting, and stoppage. Furthermore, in case an automobile travels on a flat and smooth road, a series of such processes that the engine is accelerated up to higher speed than the level of the target speed in the range of high efficiency of the engine, the pressure applied on the accelerator is relieved to thus stop the engine, and the automobile is put in the state of drifting, until lower speed than the target speed is reached, then a tread is given again on the accelerator pedal to thus accelerate the engine, are repeated by a driver, and travel is continued in such a manner that the average speed of the automobile attains the level of the target speed, whereby the difference between the efficiency at the time of acceleration of the engine in the range wherein the efficiency of the engine is low is properly made use for enabling the fuel to be saved in a favorable manner, which results in displaying an effect of reducing air pollution through reduction in the quantity of exhaust gas to be discharged.

While the invention has been described with respect to the details of preferred embodiments, many changes and variations will occur to those skilled in the art upon reading this description. Such can obviously be made without departing from the scope of the invention.

What is claimed is:

1. A fuel-saving traveling system for an internal combustion engine-driven wheeled vehicle having an accelerator pedal, comprising: an engine; means for transmitting the driving force for rotation of the wheels from said engine to a driven member; one-way clutch means arranged in place on a part of said transmitting means for transmitting the driving force only from the side of said engine to said driven member and allowing free rotation of said driven member when the number of revolutions of said driven member is in excess of the number of revolutions of the driving member; and means, actuated by the accelerator pedal, for automatically starting and stopping said engine in correspondence to the actuation of an accelerator pedal.

2. The fuel-saving traveling system set forth in claim 1 wherein said means for transmitting includes an input shaft and an input gear shaft, and said one-way clutch means is interposed in place between said input shaft and said input gear shaft.

3. The fuel-saving traveling system set forth in claim 1 wherein said one-way clutch means is arranged in place in the front section of a transmission gear.

4. A fuel-saving traveling system set forth in claim 1 wherein said one-way clutch means is arranged in place of the rear section of the transmission gear.

5. The fuel-saving traveling system set forth in claim 1 wherein said one-way clutch means is arranged in place between an output shaft and the propeller shaft of a transmission gear.

6. The fuel-saving traveling system set forth in claim 2 wherein said one-way clutch means comprises: a one-way rotor connected with said input gear shaft; an outer race formed on a part of said input shaft; and a plurality of clutch rollers arranged in place between said one-way rotor and said outer race to enable free wheeling.

7. The fuel-saving traveling system set forth in claim 6 wherein each and every one of said clutch rollers is subjected to outward pressure contact by means of a spring and a shim.

8. The fuel-saving traveling system set forth in claim 6 wherein said input gear shaft and said one-way rotor are connected with each other through a plurality of splines.

9. The fuel-saving traveling system set forth in claim 6 wherein said outer race and said one-way rotor respectively have splines formed on the outer periphery thereof, said splines having a clutch hub arranged therefor, and the driving force between said outer race and said one-way rotor is enabled to be transmitted in a selective manner by the transfer of said clutch hub.

10. The fuel-saving traveling system set forth in claim 8 wherein said clutch hub is caused to be transferred by means of a fork.

11. The fuel-saving traveling system set forth in claim 5 wherein a sleeve yoke of said propeller shaft is supported in place by a bearing.

12. The fuel-saving traveling system set forth in claim 1, wherein said stopping and starting means comprises an electrical circuit connected to said engine.

13. A fuel-saving traveling system for an internal combustion engine-driven wheeled vehicle having an accelerator pedal, a torque converter, a one-way clutch for transmitting the driving force therefor only from the side of the engine and allowing free rotation of the driven side when the number of revolutions of the driven side is in excess of the number of revolutions of the driving side, said one-way clutch being between an output shaft of a transmission gear and a sleeve yoke of a propeller shaft, and means, actuated by the accelerator pedal, for automatically starting and stopping the engine respectively, by the application of pressure on, and relief of the pressure from, the accelerator pedal, whereby, at the time of traveling of the said vehicle down a slope or in the state of drifting, although the engine is automatically stopped by relieving the pressure off the accelerator pedal, the said vehicle still remains in the state of continuing its travel.

14. The fuel-saving traveling system set forth in claim 13, wherein said stopping and starting means comprises an electrical circuit connected to said engine.

* * * * *